(12) United States Patent  (10) Patent No.: US 8,567,440 B2
Walter  (45) Date of Patent: Oct. 29, 2013

(54) SOLENOID OPERATED VALVE (75) Inventor: Raimond Walter, Roethlein (DE)

(73) Assignee: Diener Precision Pumps Ltd., Embrach (CH)

( * ) Notice: Subject to any disclaimer, the term of this patent is extended or adjusted under 35 U.S.C. 154(b) by 1404 days.

(21) Appl. No.: 12/021,917

(22) Filed: Jan. 29, 2008

(65) Prior Publication Data

US 2008/0179553 A1 Jul. 31, 2008

(30) Foreign Application Priority Data

Jan. 29, 2007 (DE) .......................... 10 2007 004 377

(51) Int. Cl.
F16K 11/052 (2006.01)
(52) U.S. Cl.
USPC .................... 137/625.44; 251/65; 251/129.16
(58) Field of Classification Search
USPC ............ 251/65, 129.19, 360, 129.16, 129.15; 137/625.44
See application file for complete search history.

(56) References Cited

U.S. PATENT DOCUMENTS

| 3,244,397 | A |   | 4/1966  | Fattor |
| 3,826,463 | A | * | 7/1974  | Beauregard .................... 251/120 |
| 4,564,046 | A | * | 1/1986  | Lungu ..................... 137/625.65 |
| 5,098,062 | A |   | 3/1992  | Lungu |
| 5,653,422 | A | * | 8/1997  | Pieloth et al. ............... 251/129.2 |
| 5,711,346 | A | * | 1/1998  | Pieloth et al. ............ 137/625.44 |
| 5,983,941 | A | * | 11/1999 | Fritz et al. ................. 137/625.65 |
| 6,145,806 | A | * | 11/2000 | Dettmann ........................ 251/65 |
| 6,286,548 | B1| * | 9/2001  | Dettmann ................ 137/596.17 |
| 2004/0025949 | A1 | * | 2/2004 | Wygnaski ................ 137/624.18 |
| 2004/0222395 | A1 |   | 11/2004 | Yee |
| 2005/0189021 | A1 |   | 9/2005 | Wygnanski |

FOREIGN PATENT DOCUMENTS

| DE | 1169242 B   | 4/1964 |
| DE | 38 14 359 C2 | 4/1994 |
| DE | 19623162 A1 | 12/1997 |
| DE | 19918007 A1 | 10/2000 |
| DE | 10225171 B3 | 2/2004 |
| GB | 1 008 888   | 11/1965 |
| GB | 1574616     | 9/1980 |
| GB | 2 124 736 A | 2/1984 |

* cited by examiner

*Primary Examiner* — John K Fristoe, Jr.
*Assistant Examiner* — Andrew J Rost
(74) *Attorney, Agent, or Firm* — Muncy, Geissler, Olds & Lowe, PLLC.

(57) ABSTRACT

A solenoid operated valve is provided for controlling liquid or gaseous media, the valve comprising at least two media ports opened and closed by an armature and a solenoid with a yoke and a coil, wherein the armature includes a magnetizable material is movably arranged inside a valve body housing having a non-magnetic material, wherein the media ports empty into the valve body housing, and wherein the valve body housing is arranged between the yoke and an additional element for magnetically interacting with the armature.

17 Claims, 8 Drawing Sheets

SOLENOID OPERATED VALVE

This nonprovisional application claims priority under 35 U.S.C. §119(a) to German Patent Application No. DE 10 2007 004 377.7, which was filed in Germany on Jan. 29, 2007, and which is herein incorporated by reference.

BACKGROUND OF THE INVENTION

1. Field of the Invention

The invention relates to a solenoid operated valve for controlling liquid or gasiform media, comprising a solenoid and at least two media ports, which can be opened and closed by an armature.

The invention may be applied in medical technology, e.g. in dialysis machines and analyzers, and in ink jet printers. Furthermore it may be applied in a plurality of fields where aggressive or delicate media are controlled by solenoid operated valves.

2. Description of the Background Art

Conventional solenoid operated valves use magnetic systems with an armature whose movement actuates an elastomer sealing element sealing and releasing valve seats. In the power-off state the armature's position is held by a compression spring or by a tension spring. High mechanical precision of some of the valve's components is required in order to provide characteristics like positioning accuracy relative to the sealing element, stop cushioning and an accurately defined path-force characteristic. In order to achieve a satisfactory service life these systems require further measures such as an anti-corrosion coating, splash-proof water protection and anti-friction coating. All these measures cause high manufacturing costs.

A desirable feature of these solenoid operated valves is to separate the medium to be controlled from the solenoid system. Conventional approaches often eliminate the media separation feature for a simpler design or to avoid implementation difficulties when miniaturizing the valves. Drawbacks of embodiments without media separation, such as large clearance volume, poor rinsing characteristics, media warming, corrosion, and jamming of the armature, are caused by the presence of the medium itself.

In conventional approaches that avoid these drawbacks, movable separating elements for sealing the fluid to be controlled by the drive system were used. For example such separating elements may be plastic, elastomeric, or metal bellows. The actuation movement is transferred to the sealing element in the valve body by distorting the separating element. These high-value separating elements are critical components since they are distorted in every switch cycle. In case of failure the medium may leak from the valve. The repeatable function of the valve is affected by the forces required for distortion and the dependence from pressure, temperature and previous history.

Furthermore conventional arrangements require a relatively large clearance volume. Valves without media separation have a large clearance volume and poor rinsing characteristics because the complex, labyrinthine magnetic system is moistened by the fluid. Valves with media separation have unfavorable clearance volume and rinsing facilities because of the usual bellows.

SUMMARY OF THE INVENTION

It is an object of the invention to provide a solenoid operated valve of the aforementioned class exhibiting a small clearance volume, good rinsing potential, short cycle time, low media heating and economic manufacturability.

It should be understood that features of the invention given hereinbelow may be arbitrarily combined which each other.

According to an embodiment of the invention the solenoid operated valve comprises a valve body housing with at least two media ports opened and closed by an armature and a solenoid with a yoke and a coil. The armature includes a magnetizable material (ferromagnetic or permanently magnetic) and is tiltably or slidably arranged in the valve body housing having a non-magnetic material. For a monostable embodiment the armature may have a ferromagnetic material. For a bistable embodiment the armature may have a permanently magnetic material. The media ports empty into the valve body housing. The valve body housing is arranged between the yoke and an additional element for magnetically interacting with the armature. The additional element may have a permanent magnet or of ferromagnetic material or it may be constructed as another solenoid.

The yoke may be designed in a U-shape comprising two yoke poles, both interacting with the armature. Thus a high efficiency is achieved, even with large air gaps resulting from thick walls of the valve body housing and from the thickness of an armature coating required to protect it against aggressive media. The valve body housing rests against the U-shaped yoke on one side and against the additional element on the opposite side.

In a monostable embodiment the armature may have a ferromagnetic steel while the additional element includes a permanent magnet. When the solenoid is in power-off state, the magnetic flux induced by the permanent magnet runs through the armature thus pulling the armature towards the permanent magnet. When the solenoid is fed a current the magnetic flux of the permanent magnet is heterodyned by the magnetic flux induced by the solenoid, so both yoke poles exhibit an attractive effect on the armature in an operating direction thus pulling the armature towards the solenoid. Thus the magnetic flux through the armature is closed, depending on the armature's position, either by the permanent magnet or by the yoke.

In another embodiment the armature may include a permanently magnetic material while the additional element include ferromagnetic parts. This arrangement forms a bistable version of the valve. The permanently magnetic armature is held in its two switching positions by either the ferromagnetic parts of the additional element or by the yoke. When a short current pulse is applied the position of the armature is determined either by the current direction or by the optional feeding of one of two part coils. Both yoke poles exhibit either an attractive or a repellent effect in the operating direction, optionally.

A non-magnetic wall may be arranged between the armature and the solenoid as well as between the armature and the additional element. The non-magnetic wall may be part of the valve body housing. In this embodiment a contact between the medium and the solenoid or the additional element is avoided thus keeping them from corroding by chemically aggressive media.

By contrast in another embodiment the valve body housing may exhibit openings allowing the yoke poles to extend into the interior of the valve body housing in as much as allowing the armature to hit on the yoke poles directly without an air gap. This embodiment allows for using a remarkably smaller magnetic flux (and thus a smaller current through the coil) for holding the armature at the yoke poles than for pulling it there, at least in the monostable embodiment. For example 24V voltage may be impressed on the solenoid for pulling the armature towards the yokes. Once the armature reaches this position after a few milliseconds the voltage may be lowered to e.g. 3V. Thus energy may be saved on the one hand. On the other hand overheating of the solenoid by power loss is avoided, in particular with miniaturized valves. In order to keep the armature sticking to the yoke poles with this small holding voltage the armature and the yoke poles need to be in direct contact. The yoke poles may be sealed in the openings of the valve body housing, e.g. by elastomer sealing elements.

In another embodiment the armature is injection-molded and magnetized in such a manner, that a north pole is situated at one end of the armature in a longitudinal axis direction and wherein a south pole is situated at an opposite end, wherein lines of magnetic flux running between the north pole and the south pole leave from the armature and enter into the armature basically perpendicularly. By this kind of magnetization the permanent magnetic armature closes a magnetic circuit in both switching positions, so in either switching position high retention forces are achieved even with power off. When the solenoid is fed a current, particularly high repellent or attractive forces, depending on a current direction, affect the armature, since in this kind of magnetization both ends of the armature provide the force. With this magnetization the lines of magnetic flux leave into the working air gap, only, so undesirable interaction with the environment do not occur, i.e. neither may lines of magnetic flux leave from the valve nor do magnetic fields from the environment affect the valve. In conventional, i.e. axially magnetized armatures the lines of magnetic flux leave and enter in the direction of the longitudinal axis so significantly smaller forces are obtainable and interaction with ambient magnetic fields may not avoided.

In another embodiment the permanently magnetic armature is formed as a multipart armature, e.g. in three parts, in such a manner, that a north pole is situated at one end of the armature in a longitudinal axis direction and wherein a south pole is situated at an opposite end, wherein lines of magnetic flux running between the north pole and the south pole leave from the armature and enter into the armature basically perpendicularly. Such a three part armature may have a permanent magnet arranged between two ferromagnetic components. When this armature is arranged outside the installation location of the valve without adjacent magnetizable materials or magnetic fields it behaves like an axially magnetized magnet. When arranged in the installation location between the solenoid and the additional element the lines of magnetic flux find the path of least resistance through the ferromagnetic components and the smallest possible air gap towards the yoke poles of the solenoid or towards the additional element. Neither may lines of magnetic flux leave from the valve nor do magnetic fields from the environment affect the valve.

In an embodiment the armature may be tiltable in two stages when switching between two positions in the valve body housing, wherein a first end of the armature changes position before a second end of the armature.

In one alternative embodiment only the second end of the armature may seal a valve seat of one of the media ports in the position, from which the two stage tilt movement is executable. The position of the first end may be achieved with relatively low effort since a pressure admission takes no effect here. Thus the valve seat at the second end is slightly opened by leverage, so a difference in pressure is relieved and the resulting reduced contact force leads to a reduced demand in force for changing the position of the second end. The principle function corresponds to that of a pilot valve.

By contrast in another embodiment the second end of the armature may seal a main valve seat of one of the media ports in the position, from which the two stage tilt movement is executable while a smaller pilot valve seat of this media port is sealed by the first end of the armature. This embodiment acts like a piloted valve. A travel movement at the first end opens the pilot valve seat and leads to a pressure fade-out thus easing the opening of the main valve seat. Due to the pilot valve seat's smaller width it is subjected to a respectively smaller pressure force than the main valve seat under the same pressure conditions. A travel distance of the second end may be greater than a travel distance of the first end between the two positions thus further increasing the valves efficiency.

In an embodiment, an elastomer sealing element for sealing the media port may be securely attached to the valve body housing. Thus mechanical play of the armature does not affect the tightness since the armatures hard sealing face is not subject to deformation under pressure.

The armature may be disk shaped, plate shaped or cylinder shaped and designed to perform a tilting movement or a stroke movement.

In another embodiment, the armature may be suspended from a wire arrangement. Thus any friction is avoided at the armature so friction forces and fretting are avoided.

The invention features a number of advantages, including: the arrangement may be produced with remarkably lower costs than conventional designs; both 2/2-way and 3/2-way valves may be implemented. Furthermore several valve seats may be sealed in each armature end position; the arrangement has a reduced clearance volume compared to conventional valves The clearance volume is basically caused by the travel required for the valve switch function only; the arrangement may be rinsed easily; short cycle times may be achieved; media warming may be extensively avoided; the arrangement may be miniaturized; the arrangement may be designed as monostable or bistable; elaborate measures for separating media, e.g. by a flexible bellows as in conventional valves are not required; the magnetic field of the permanently magnetic additional element in the monostable embodiment is shielded by the armature so parasitic magnetic interaction with other components of the solenoid operated valve is avoided; and/or common parts may be used when implementing different valve types (monostable, bistable, 2-way, 3-way). In particular the solenoid and most of the parts of the valve body may be used for all types. Also, merely the armature and the additional element have to be adapted fort he monostable or bistable type.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
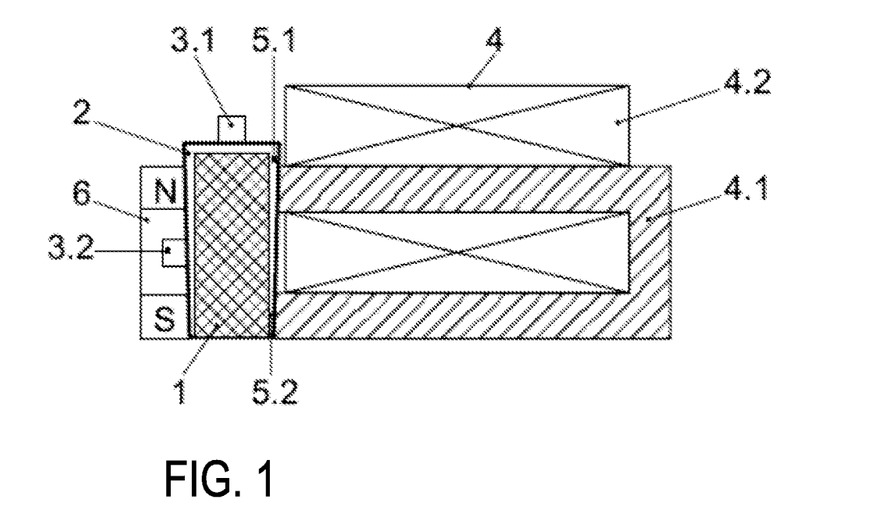
FIG. 1 illustrates a monostable embodiment of a solenoid operated valve of the 2/2-way type.

The 2/2-way valve shown in FIG. 1 exhibits a ferromagnetic armature 1 situated in a valve body housing 2 includes a non-magnetic material. The valve body housing may preferably have injection-molded thermoplastic.

The armature 1 is able to pivot about a tilting axis not shown here which is projecting out of the image plane. The media ports 3.1 and 3.2 empty into the valve body housing 2. The valve body housing 2 rests against the permanent magnet 6 with one side and against the U-shaped yoke 4.1 with an opposite side. One leg of the yoke 4.1 is surrounded by the coil 4.2. The magnetic circuit of the solenoid 4 runs through the yoke 4.1 and is closed by the armature 1 and two air gaps 5.1 and 5.2. In power-off state the magnetic flux of the permanent magnet 6 runs from its north pole N via the armature 1 to the permanent magnets 6 south pole S and back through the permanent magnet 6. Thereby the armature 1 is attracted by the permanent magnet 6. The armature 1 remains stably in this position thus sealing the media port 3.2. When a current runs through the coil 4.2 the system tends to close the air gaps 5.1 and 5.2 so the armature 1 moves towards the yoke 4.1. Thus the media port 3.2 is opened and the medium may flow through the media ports 3.1 and 3.2. In the embodiment shown the armature 1 bears on the lower side of the valve body housing 2 and performs a tilt movement (e.g. of about ±100) about a rotating axis located in the lower side. For stabilizing the position of the armature 1 a slight preferential magnetic force takes effect on the armature 1 bearing it against the lower side of the valve body housing 2. This is achieved by arranging the U-shaped yoke 4.1 and the permanent magnet 6 serving as the additional element slightly shifted downwards relative to the armature 1. In an advantageous embodiment the armature 1 may be suspended from a titanium wire thus providing a friction-free bearing.

Figure 2:
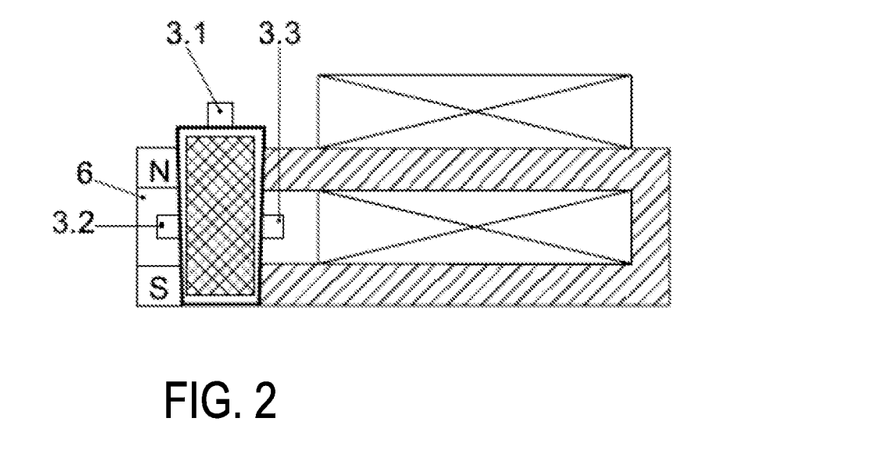
FIG. 2 illustrates a bistable embodiment of the solenoid operated valve of the 3/2-way type.

FIG. 2 shows an embodiment of the valve of the 3/2-way type. Here the three media ports 3.1, 3.2 and 3.3 empty into the valve body housing 2, wherein the media ports 3.2 and 3.3 are arranged in opposite faces of the valve body housing 2. The media ports 3.2 and 3.3 are sealed by the armature 1 depending on its position. The solenoid valve is operated the same way as in FIG. 1.

FIG. 3 shows an embodiment of the valve of the 2/2-way bistable type. Here the armature 1 includes a permanent magnet with north pole N and the south pole S. As in the monostable embodiments described above a solenoid 4 is situated on one side of the valve body housing 2. A ferromagnetic additional element 8 is arranged on the opposite side.

Figure 3A:
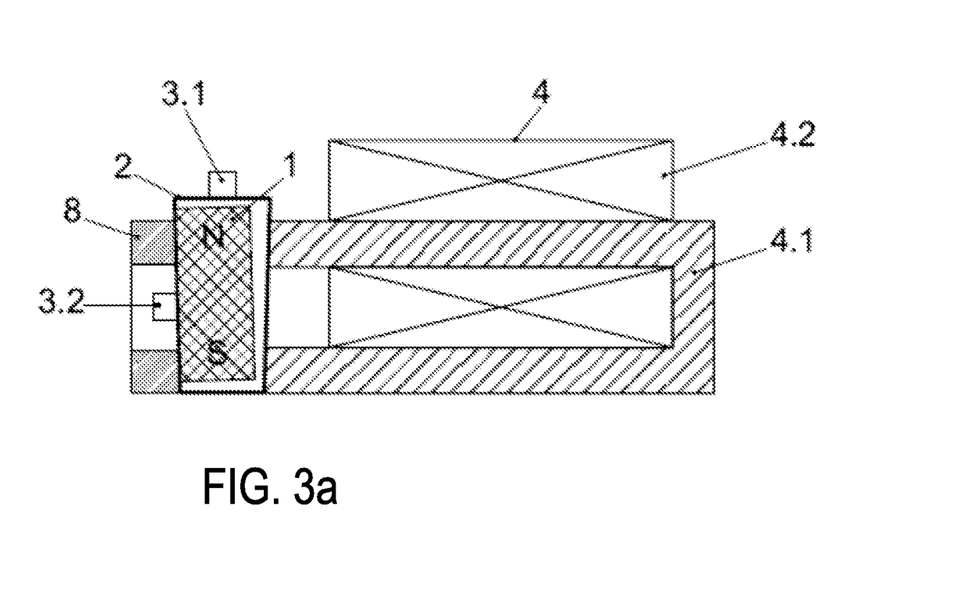
FIG. 3 illustrates a bistable embodiment of the solenoid operated valve of the 2/2-way type.

In the position shown in FIG. 3a the armature 1 seals the left media port 3.2. The permanently magnetic armature 1 forms a magnetic circuit with the ferromagnetic additional element 8 and the interjacent air gaps and remains stably in this position.

Figure 3B:
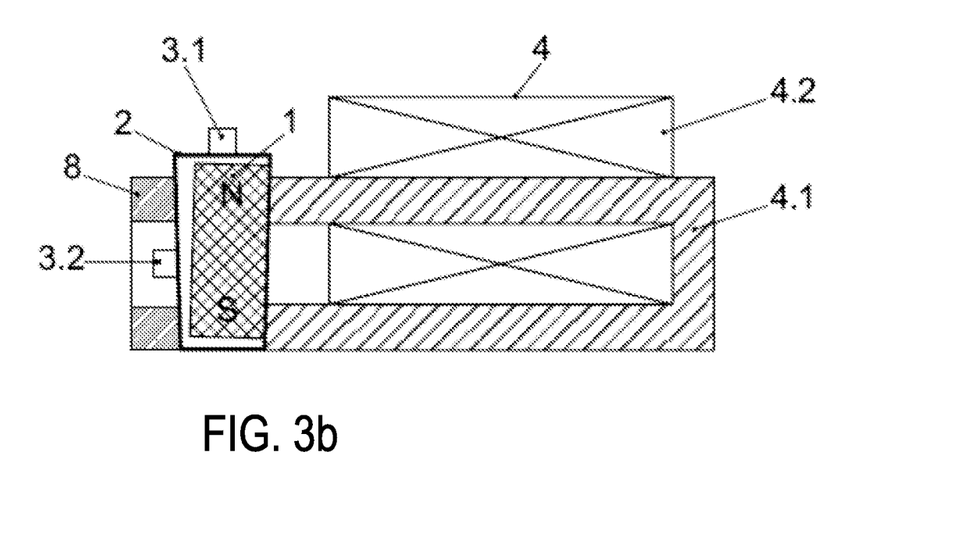

When a current pulse flows through the solenoid 4 the induced electromagnetic flux causes the armature 1 to perform a tilting movement towards the solenoid 4. This state is shown in FIG. 3b. The armature 1 remains in this position even when the solenoid is dead since the magnetic flux induced by the permanently magnetic armature 1 is closed by the yoke 4.1 of the solenoid 4 thus causing to magnetic attraction forces between the armature 1 and the yoke 4.1. If the solenoid 4 is subjected to a current pulse in opposite direction the armature 1 is repelled from the yoke 4.1 and tilts back in the position shown in FIG. 3a.

Figure 4:
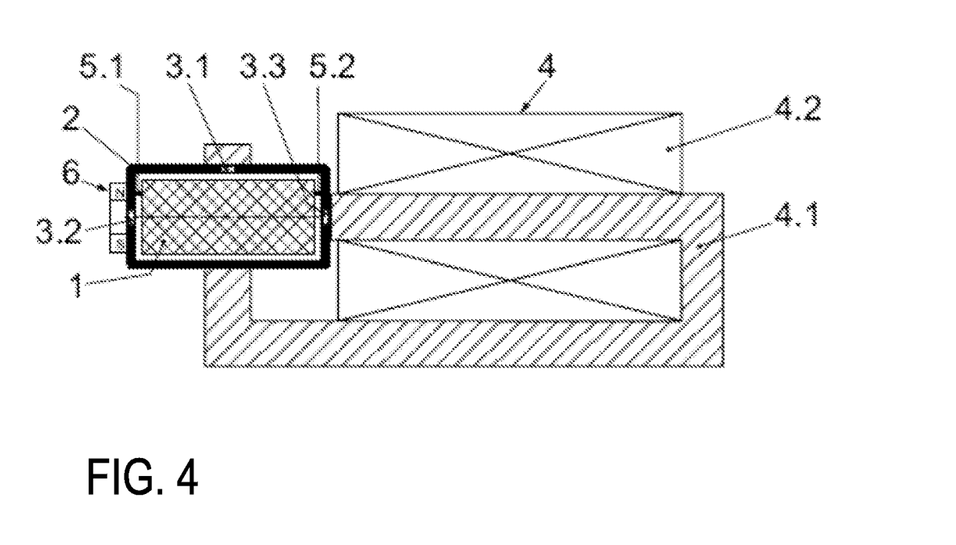
FIG. 4 illustrates a monostable embodiment of the solenoid operated valve with a cylinder shaped armature.

FIG. 4 shows an embodiment with the armature 1 having a cylinder shape and designed to perform a travel movement when actuated.

Figure 5A:
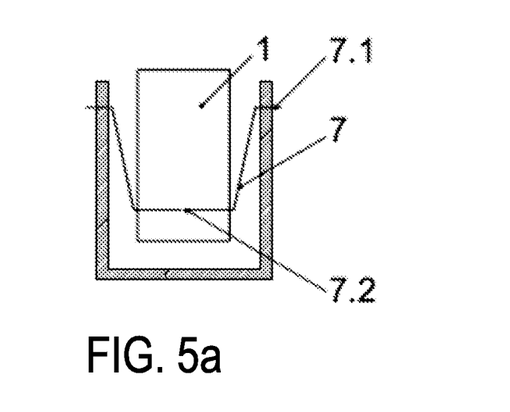
FIG. 5 illustrates an arrangement with the armature supported by a wire arrangement.
Figure 5B:
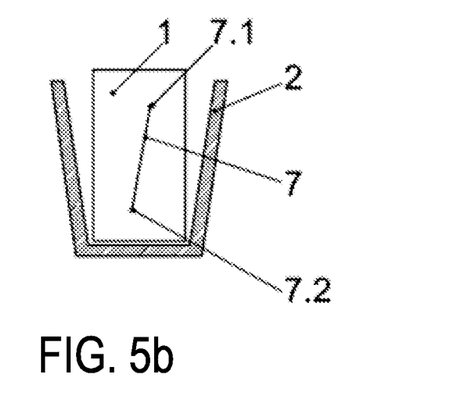

FIG. 5 shows two views of an arrangement with the armature 1 suspended from a wire arrangement in a swing style. In this a wire bracket 7 is arranged in center with a fixing 7.2 in the armature 1 and with its ends 7.1 in the valve body housing 2.

Figure 6:
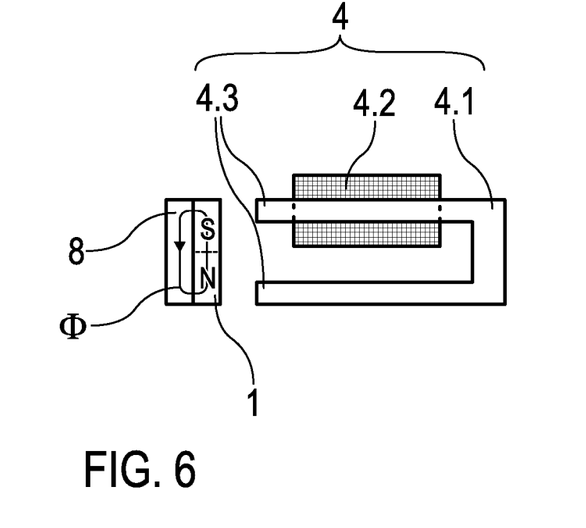
FIG. 6 illustrates a bistable embodiment of the solenoid operated valve, comprising a solenoid with a U-shaped yoke, whose both yoke poles interact with an armature, the armature in a first position shifted towards an additional element.

FIG. 6 shows a bistable embodiment of the solenoid operated valve, the valve comprising a solenoid 4 with a coil 4.2 and a U-shaped yoke 4.1. The yoke comprises two yoke poles 4.3 interacting with the armature 1. The armature 1 is shown in a first position tilted towards an additional element which is constructed as a ferromagnetic additional element 8 here. E.g. the ferromagnetic additional element 8 may include iron. The armature 1 is designed permanently magnetic with a north pole N and a south pole S. A magnetic flux $\Phi$ is effective between the armature 1 and the ferromagnetic additional element 8. The armature 1 remains in the first position shown when the coil 4.2 is dead since the magnetic flux $\Phi$ is closed by the ferromagnetic additional element 8 here.

Figure 7:
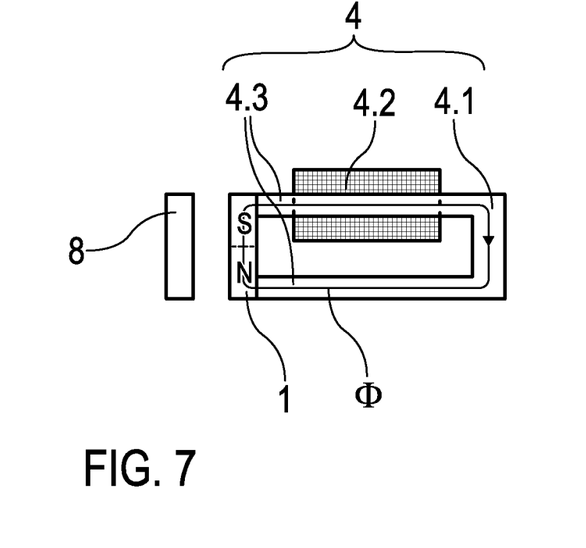
FIG. 7 illustrates the valve from FIG. 6 in a second position, wherein the armature is shifted towards the yoke.

FIG. 7 shows the valve from FIG. 6 in a second position with the armature 1 shifted towards the yoke 4.1. By feeding the coil 4.2 a current in the position shown in FIG. 6 the armature 1 is attracted by both yoke poles 4.3 and switched into the second position. Once it has taken this position further current feeding of the coil 4.2 is not required since the magnetic flux $\Phi$ between the yoke 4.1 and the armature 1 is effective even without current feeding causing the armature 1 to remain in the second position. For switching back into the first position another short termed current feed of the coil 4.2 is required leading to a repellent effect between the armature 1 and the yoke 4.1.

Figure 8:
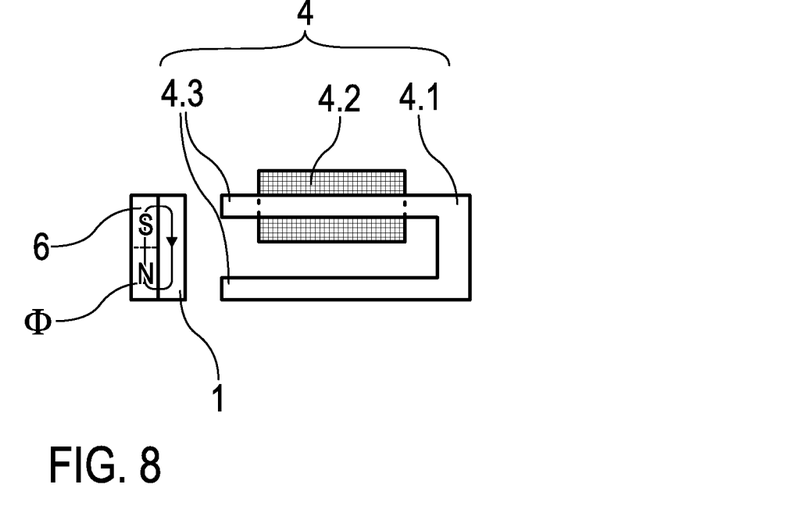
FIG. 8 illustrates a monostable embodiment of the solenoid operated valve in a first position with the armature shifted towards an additional element.

FIG. 8 shows a monostable embodiment of the solenoid operated valve, the valve comprising the solenoid 4 with the coil 4.2 and the U-shaped yoke 4.1. The yoke comprises two yoke poles 4.3 interacting with the armature 1. The armature 1 is shown in the first position shifted towards the additional element which is constructed as a permanent magnet 6 with a north pole N and a south pole S here. The armature 1 includes a ferromagnetic material, e.g. iron. The magnetic flux $\Phi$ acts between the armature 1 and the permanent magnet 6. The armature 1 remains in the first position shown when the coil 4.2 is dead.

Figure 9:
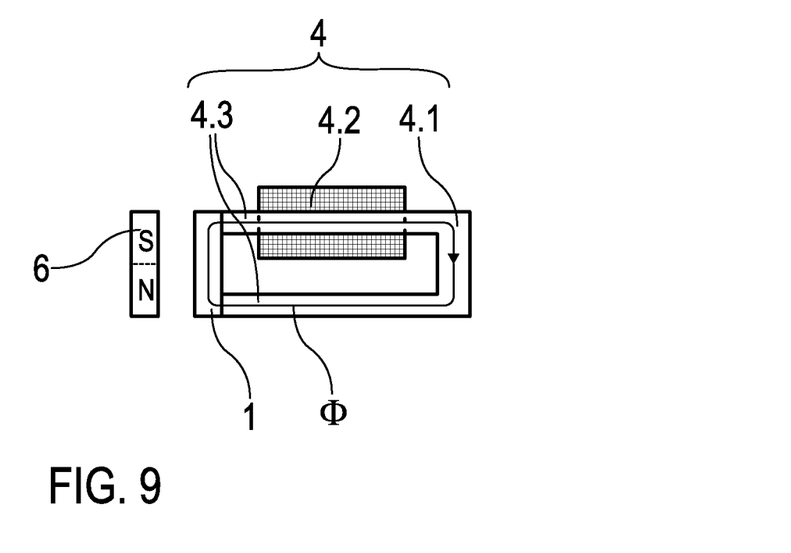
FIG. 9 illustrates the valve from FIG. 8 in a second position, wherein the armature is shifted towards the yoke.

FIG. 9 shows the valve from FIG. 8 in the second position with the armature 1 shifted towards the yoke 4.1. By feeding the coil 4.2 a current in the first position shown in FIG. 8, the armature 1 is attracted by both yoke poles 4.3 and switched into the second position. In order to keep the armature 1 in this position, a permanent current feed of the coil 4.2 is required. Otherwise the permanent magnet 6 would switch the armature 1 back into the first position. The magnetic flux Φ through the armature 1 is closed by the yoke 4.1.

Figure 10:
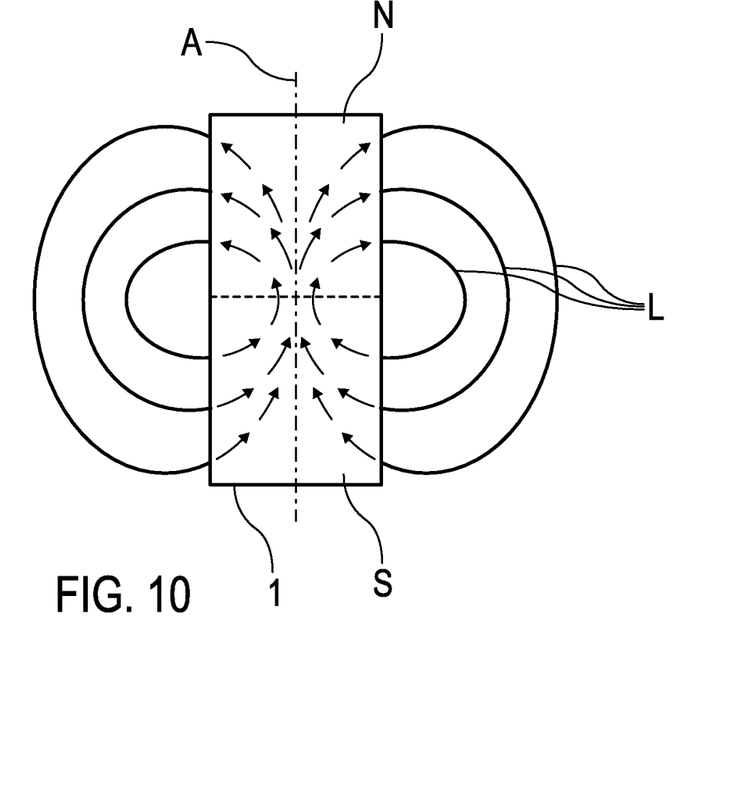
FIG. 10 illustrates a permanently magnetic armature with a magnetization causing lines of magnetic flux running between a north pole and a south pole to essentially leave and enter essentially at right angles with a longitudinal axis.

FIG. 10 shows the permanently magnetic armature 1 from FIGS. 6 and 7. It is magnetized in a manner causing lines L of magnetic flux running between the north pole N and the south pole S to leave and enter basically perpendicularly to a longitudinal axis A. This characteristics of the lines L of magnetic flux may be achieved by a multipart design (e.g. three part design) of the armature 1 or by respectively magnetizing an injection-molded armature 1.

Figure 11:
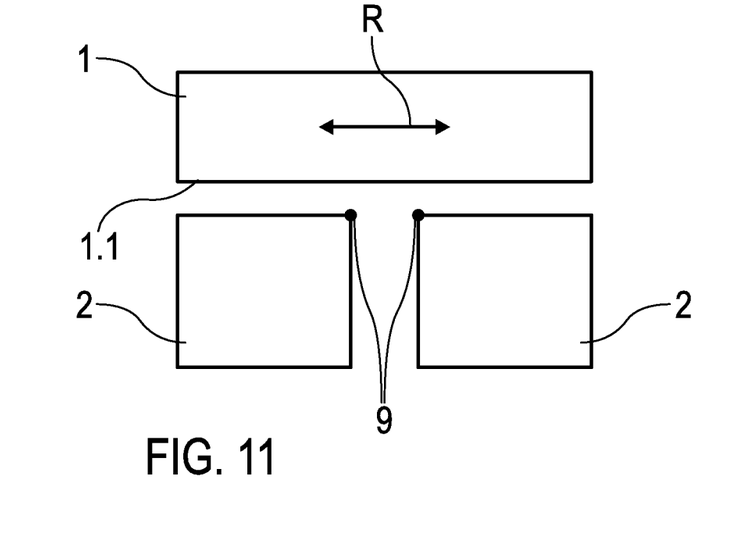
FIG. 11 illustrates a media port with an elastomer sealing element and the armature.

FIG. 11 shows a media port 3 with an elastomer sealing element 9 and the armature 1. By contrast to conventional valves the elastomer sealing element 9 is not fixed to the armature 1 but to the valve body housing 2. The armature 1 faces the media port 3 with a hard sealing face 1.1. The arrangement shown makes sure the media port 3 is sealed tightly even with mechanical play of the armature in a radial direction R. Although the compression set of the elastomer sealing element 9 due to alternating strain is inevitable here as well, it does not worsen the tightness.

Figure 12A:
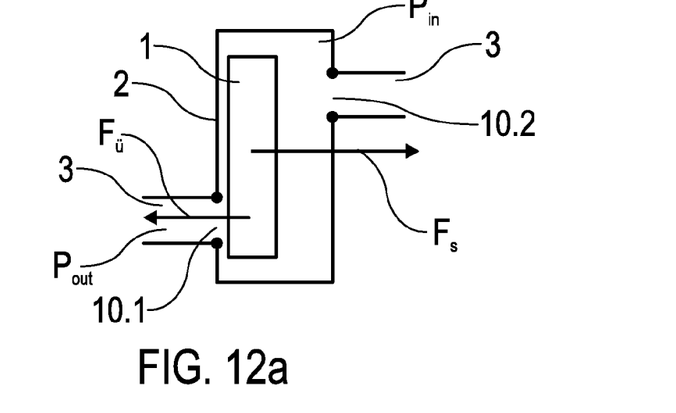
FIG. 12 illustrates a valve body housing with two valve seats and an armature tiltable in two stages.
Figure 12B:
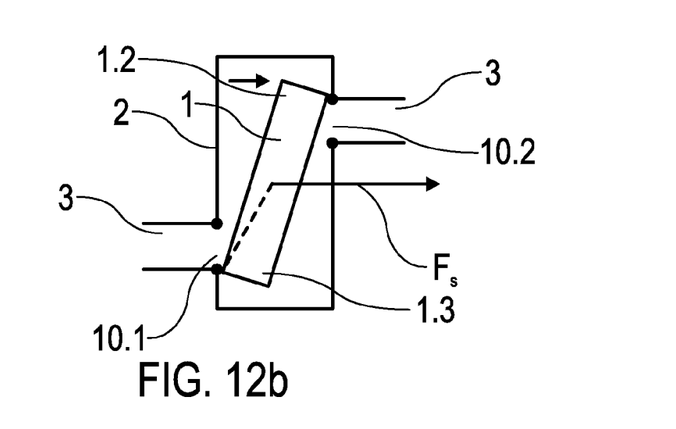
Figure 12C:
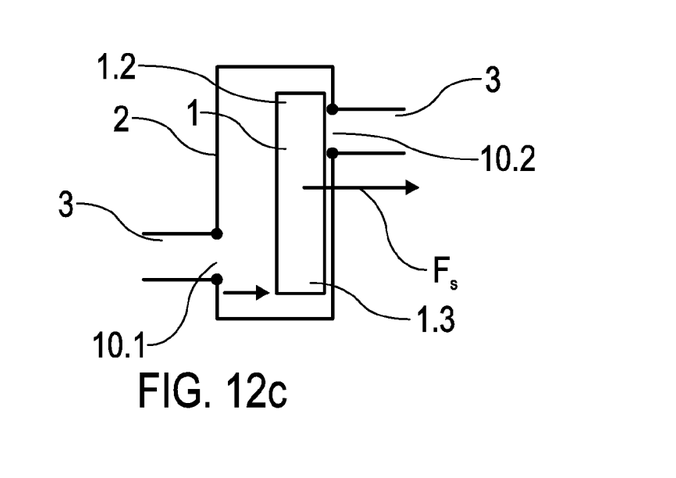

FIG. 12 shows the valve body housing 2 and an armature 1 tiltable in two stages. The valve body housing 2 has two media ports 3 each with a valve seat 10.1, 10.2. In FIG. 12a the armature 1 is in the first position sealing the valve seat 10.1 with a sector at an end of the armature 1. Inside the valve body housing 2 the medium has an input pressure $P_{in}$ which is greater than an output pressure $P_{out}$ behind the valve seat 10.1. Due to the difference between the input pressure $P_{in}$ and the output pressure $P_{out}$ a force $F_ü$ presses the armature 1 against the valve seat 10.1. A magnetically caused switching force $F_s$ acts in the opposite direction. FIG. 12b shows the armature 1 in a first stage of a tilting movement due to the switching force $F_s$. A first end of the armature 1 which is hardly affected by the force $F_ü$ tilts towards the valve seat 10.2. In this due to leverage the valve seat 10.1 becomes leaky and the difference in pressure is leveled. The force $F_ü$ vanishes thus allowing to perform a second stage of the tilt movement with a smaller switching force $F_s$. In the second stage the second end of the armature 1 changes the position as shown in FIG. 12c, so the valve seat 10.2 is sealed. For a position change in the opposite direction the respective other end of the armature 1 is regarded as first and second end.

Figure 13A:
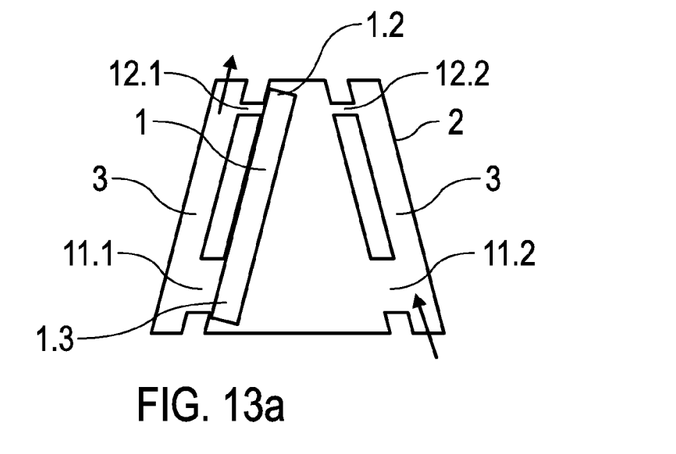
FIG. 13 illustrates a valve body housing with an armature tiltable in two stages and two media ports, each media port with a main valve seat and a pilot valve seat.
Figure 13B:
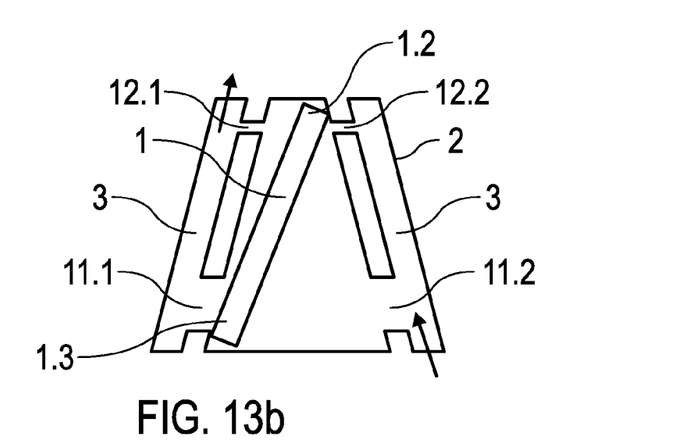
Figure 13C:
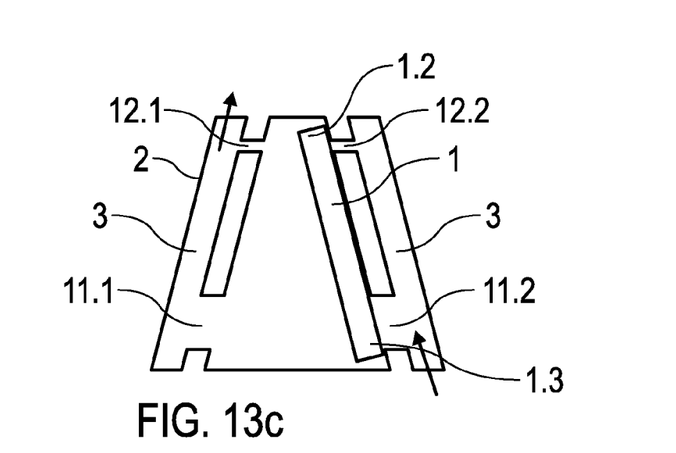

FIG. 13 shows an embodiment of the valve body housing 2 and an armature tiltable in two stages. The valve body housing 2 has two media ports 3 each with a main valve seat 11.1, 11.2 and a pilot valve seat 12.1, 12.2. The pilot valve seats 12.1, 12.2 have a remarkably smaller area than the main valve seats 11.1, 11.2. In FIG. 13a the armature 1 is in the first position sealing the main valve seat 11.1 with a sector at the first end of the armature 1 and sealing the pilot valve seat 12.1 with a sector at the second end of the armature 1. In FIG. 13b the armature 1 is shown in a first stage of the tilting movement. In this the first end of the armature 1 tilts from the pilot valve seat 12.1 towards the pilot valve seat 12.2. Thus a difference in pressure between the inside of the valve body housing 2 and the media port 3 behind the main valve seat 11.1 and the pilot valve seat 12.1 is relieved thereby reducing the required switching force $F_s$ for tilting the second end of the armature 1 from the main valve seat 11.1 towards the main valve seat 12.2, as shown in FIG. 13c.

The embodiments described above have a non-magnetic wall arranged between the armature 1 and the solenoid 4 as well as between the armature 1 and the additional element 6 or 8 in common, the non-magnetic wall being part of the valve body housing 2.

In an alternative contrasting embodiment the valve body housing 2 may exhibit openings allowing the yoke poles 4.1 to extend into the interior of the valve body housing 2 in as much as allowing the armature 1 to hit on the yoke poles 4.1 directly without an air gap. The yoke poles 4.1 may be sealed in the openings, e.g. by elastomer sealing elements.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A solenoid operated valve for controlling liquid or gaseous media, the valve comprising:
    an armature;
    a valve body housing including a non-magnetic material;
    a solenoid with a yoke and a coil; and
    at least two media ports configured to be opened and closed by the armature and the solenoid,
    wherein the armature includes a magnetizable material that is movably arranged inside the valve body housing,
    wherein the at least two media ports empty into the valve body housing,
    wherein the valve body housing is arranged between the yoke and an additional element for magnetically interacting with the armature,
    wherein the armature includes a permanent magnetic material,
    wherein the armature is formed as a multi part armature in such a manner that a north pole is situated at one end of the armature in a longitudinal axis direction and wherein a south pole is situated at an opposite end, wherein lines of magnetic flux running between the north pole and the south pole leave from the armature and enter into the armature basically perpendicularly to the longitudinal axis, wherein the yoke is designed as a U-shaped yoke with two yoke poles, a first one of the two yoke poles interacting with the north pole of the armature and a second one of the two yoke poles interacting with the south pole of the armature,
    wherein the multipart armature comprises a permanent magnet arranged between two ferromagnetic components, and
    wherein the armature closes one of a pair of independent magnetic circuits through the additional element if the armature is in a first position and the armature closes another of the pair of independent magnetic circuits through the yoke if the armature is in a second position.

2. The solenoid operated valve according to claim 1, wherein the armature includes a ferromagnetic steel and the additional element includes a permanent magnet, wherein a magnetic flux induced by the permanent magnet runs through the armature and is heterodynable by a magnetic flux induced by the solenoid, and wherein both yoke poles exhibit an attractive effect in an operating direction.

3. The solenoid operated valve according to claim 1, wherein the additional element includes a ferromagnetic material, and wherein the two yoke poles optionally exhibit a repellent effect or an attractive effect in an operating direction.

4. The solenoid operated valve according to claim 3, wherein the armature is injection-molded and magnetized in such a manner, that a north pole is situated at one end of the armature in a longitudinal axis direction and wherein a south pole is situated at an opposite end, wherein lines of magnetic flux running between the north pole and the south pole leave from the armature and enter into the armature basically perpendicularly.

5. The solenoid operated valve according to claim 1, wherein a non-magnetic wall is arranged between the armature and the solenoid.

6. The solenoid operated valve according to claim 1, wherein the valve body housing has openings allowing the yoke poles to extend into the interior of the valve body housing in as much as allowing the armature to hit on the yoke poles.

7. The solenoid operated valve according to claim 1, wherein the armature is tiltable in two stages when switching between two positions in the valve body housing, wherein a first end of the armature changes the position before a second end of the armature.

8. The solenoid operated valve according to claim 7, wherein in the position, from which the two stage tilt movement is executable, a valve seat of one of the media ports is sealed by the second end of the armature.

9. The solenoid operated valve according to claim 7, wherein in the position, from which the two stage tilt movement is executable, a main valve seat of one of the media ports is sealed by the second end of the armature and a smaller pilot valve seat of the same media port is sealed by the first end of the armature.

10. The solenoid operated valve according to claim 9, wherein a travel of the second end between the two positions is greater than a travel of the first end.

11. The solenoid operated valve according to claim 1, wherein an elastomer sealing element for sealing the media port is securely attached to the valve body housing.

12. The solenoid operated valve according to claim 1, wherein the armature is disk shaped or plate shaped or cylinder shaped.

13. The solenoid operated valve according to claim 1, wherein the valve body housing includes injection-molded thermoplastics.

14. The solenoid operated valve according to claim 1, wherein the yoke is arranged in a manner to thereby subject the armature to a preferential force in a rotational axis direction.

15. The solenoid operated valve according to claim 1, wherein the armature is supported by a wire arrangement.

16. The solenoid operated valve according to claim 1, wherein the armature is suspended from a wire.

17. The solenoid operated valve according to claim 1, wherein the U-shaped yoke and the permanent magnet are positioned such that the U-shaped yoke and the permanent magnet are shifted downward with respect to the armature.

* * * * *